United States Patent Office 3,111,512
Patented Nov. 19, 1963

3,111,512
THIOLATION OF PROTEINS WITH N-ACYL-HOMOCYSTEINE THIOLACTONE
Reinhold Benesch and Ruth E. Benesch, Falmouth, Mass., assignors to Research Corporation, New York, N.Y., a corporation of New York
No Drawing. Filed May 14, 1959, Ser. No. 813,077
7 Claims. (Cl. 260—117)

This invention relates to methods for the introduction of sulfhydryl (—SH) groups and disulfide (—SS—) bonds into macromolecules containing aliphatic amino groups, particularly proteins, and to the novel thiolated proteins and their oxidation products.

We have found that by the treatment of macromolecules containing aliphatic amino groups with cyclic thiolesters, especially thiolactones, in the presence of ions of silver, copper, mercury or lead, groups containing the —SH group are readily introduced into the molecule under mild conditions which are particularly favorable for the avoidance of degradation and denaturation of proteins.

Particularly suitable for the thiolation of proteins are the N-acylhomocysteine thiolactones, wherein the acyl group may be an arylcarboxylic acid group, such as benzoyl, or an alkanoyl group. The lower alkanoylhomocysteine thiolactones, such as N-acetylhomocysteine thiolactone, are especially useful because of their ready solubility in water, ease of purification and stability.

Silver ions, provided by a water soluble silver salt such as silver nitrate, are preferred catalytic agents. It is to be noted that the silver enters into the intermediate reaction product complex so that the extent of the reaction can be readily controlled by adjustment of the proportion of silver supplied to the reaction.

By the method of the invention, proteins with up to 50 —SH groups per $10^5$ g. have been prepared. The number to be introduced can be varied over a wide range in a predictable manner by controlling the reaction conditions, particularly the amount of catalytic metal ion. The —SH groups are linked to the protein by a stable, covalent bond, i.e. a peptide bond. The use of an internal thiolester as a thiolating agent serves the dual purpose of activating the carboxyl group and protecting the —SH group. After opening of the ring the —SH groups are protected by silver. The conditions for the thiolation are extremely mild, i.e. neutral pH, completely aqueous solution, room temperature and reaction times of only a few minutes, so that no degradation and little, if any, denaturation of proteins takes place during the thiolation. —SH groups have been introduced into commercial gelatin, ovalbumin, serum albumin, tropomyosin, light meromyosin, hemoglobin, ribonuclease, polylysine, wool, and silk by the method of the invention.

The proteins with added —SH groups are very similar in physical properties to the parent proteins but they have lower isoelectric points, are less susceptible to tryptic hydrolysis, and show the chemical reactions of polythiols, such as, very high affinity for heavy metals, reaction and with alkyl halides to form stable thioethers, addition to activated double bonds and reducing properties.

A particularly useful property of the proteins with added —SH groups is the possibility of oxidizing them to products with either intradisulfide or interdisulfide groups, depending on the conditions of oxidation and particularly on the concentration of the thiolated protein. The two types of oxidation products differ very greatly in their properties. Oxidation of the thiolated gelatin in dilute solutions leads to derivatives with greatly lowered melting points. Oxidation of thiolated proteins in concentrated solution leads to polymerized products, precipitates, fibers or gels depending on the protein and the conditions of oxidation. Oxidation of thiolated gelatin in concentrated solutions (from about 2 to about 7% depending on the quality of the parent gelatin and the extent of thiolation) oxidation results in the formation of clear, colorless rigid gels which are not liquefied by heat. They can, however, be liquefied by the action of reducing agents such as thiols. Both the time and temperature of setting can be varied at will over a wide range resulting in products useful for pharmaceutical bases, hair setting and other cosmetic preparations, photographic films bases, production of gelatin microcapsules, and many other uses.

Thermosetting gels can be produced with hydrogen peroxide whereas gelling at room temperature can be effected in a matter of seconds with fericyanide or lipoic acid monosulfoxide. Other substances, including other proteins can be trapped in these gels.

The non-setting gelatin derivatives obtainable by oxidation of thiolated gelatin in dilute solution, preferably less than 1%, should be useful plasma substitutes as relatively concentrated non-gelling solutions can be made.

The intradisulfide products can also be converted into non-melting gels by a process of disulfide interchange in alkaline media in the presence of small amounts of thiol compounds.

The following specific examples are illustrative of the principles of the invention:

EXAMPLE 1—THIOLATED GELATIN 1 g. gelatin (type A, having a bloom value of 75, a viscosity of 18 mp., and an isoelectric point of 6.95) is dissolved in 20 ml. water with slight warming (40° C.). 0.168 g. N-acetylhomocysteine thiolactone (AHTL) is added. Then 1.05 ml. 1 N $AgNO_3$ is added in small portions together with enough NaOH to keep the pH at 7.5. A total of 2.9 ml. 0.5 N NaOH is required. The time for the additions is about 15–20 minutes. The mixture is acidified with 2.4 ml. 0.85 N $HNO_3$, followed by the addition of 2 g. thiourea to remove the silver from the thiolated gelatin. This produces a clear, colorless solution, which is worked up in either of the following ways:

(a) The solution is passed through a column of Dowex 50 and the protein eluted with 1 N thiourea/0.01 N $HNO_3$; the eluate is brought to pH 6–7 with NaOH and passed through a column of Amberlite IRA–400; the eluate from this is dialyzed until free of thiourea and dried in the frozen state.

(b) The protein is precipitated with 2–3 volumes of acetone, the precipitate washed with this solvent until free of thiourea and dried in a current of nitrogen.

The product is a white solid, freely soluble in water to give clear solutions. It is stable for prolonged periods provided it is kept dry. It contains 20 —SH groups per $10^5$ g. Yield 85%.

Type B gelatin may be also thiolated in the same way.

In the thiolation reaction illustrated in the foregoing example, thiol containing groups are attached by peptide-type bonds to the amino groups of the protein resulting in thiolated proteins of the general formula

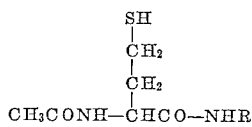

wherein —NHR represents the original protein.

EXAMPLE 2—LOW MELTING GELATIN 0.200 g. thiolated gelatin (29 —SH per $10^5$ g.) is dissolved in 100 ml. water and the pH brought to 7.0 with NaOH. 0.7 ml. 0.1 M potassium ferricyanide is added. After 1 hour the nitroprusside test is negative. The solution is passed through Amberlite IRA–400, dialyzed until free of salt and dried from the frozen state.

The product is a white solid, freely soluble in water. A 2% solution remains liquid after 24 hours at 0° C. A 3% solution remains liquid after 24 hours at 0° C. A 4% solution sets after 105 minutes at 0° C. and melts at 8° C. (Parent gelatin: 2% sets in 2 minutes, melts at 22° C.; 3% sets in 2 minutes, melts at 25° C.; 4% sets in 2 minutes, melts at 26° C.)

EXAMPLE 3—NON-MELTING GELATIN (a) *Setting at Room Temperature*

0.060 g. thiolated gelatin (27 —SH per $10^5$ g.) is dissolved in 1 ml. 0.1 M phosphate buffer at pH 7.0 and 0.14 ml. 0.1 M potassium ferricyanide is added. In 3–5 minutes a colorless gel is formed. This does not melt in boiling water.

(b) *Setting With Heat*

0.060 g. thiolated gelatin (27 —SH per $10^5$ g.) is dissolved in 1 ml. 0.1 M phosphate buffer at pH 7.0 and 0.14 ml. 0.1 M $H_2O_2$ is added. No gelation occurs at room temperature. Gelation in 30 minutes at 40° C. Gelation in 10 minutes at 60° C. The gels do not melt in boiling water.

(c) *Setting Without an Oxidising Agent*

This is affected by transforming the intradisulfide gelatin into a non-melting gel by disulfide interchange:

1.0 ml. of a 10% aqueous solution of intradisulfide gelatin (prepared as described in Example 2) is treated with 0.06 ml. 0.01 N β-mercaptoethylamine and 0.025 ml. 0.5 N NaOH. The solution sets almost instantaneously to a non-meltable gel. If the β-mercaptoethylamine is omitted, setting takes places somewhat more slowly, the initiating thiol arising probably from either residual —SH groups or hydrolysis of —S—S— bonds.

EXAMPLE 4—THIOLATED OVALBUMIN 0.058 g. AHTL are dissolved in 10 ml. of a 2.4% aqueous solution of crystalline ovalbumin. 0.36 ml. 1 N $AgNO_3$ is added in small portions together with 0.85 ml. 0.5 N NaOH to keep the pH at 7.5. Time for additions 10–20 minutes. The mixture is treated with 3 ml. of a solution of the following composition: (0.325 g. KCN+5 ml. 1 M tris(hydroxymethylaminomethane)+4 ml. 2 N $H_2SO_4$+1 ml. $H_2O$) and passed through a column of Amberlite IRA–400. The eluate is dialyzed until free of cyanide and dried from the frozen state.

The product is undenatured and contains 30 new —SH groups per $10^5$ g. Yield 90%.

Among the potential uses of the thiolation method and thiolated proteins of the invention are:

Tagging of proteins by using radioactive ($S_{35}$) thiolating agent for the determination of extracellular space, rate of disappearance of plasma substitutes, detection of traces of protein, bacteria or viruses and their differentiation from dust, etc.

Formation of thioethers between thiolated proteins and ordinary or fluorescent dyes. This will permit detection of proteins in such procedures as chromatography, paper electrophoresis, staining in tissues, etc. for clinical diagnostic purposes.

Reaction with heavy metals, e.g., in photography.

Activation of enzymes, e.g. permanently activated papain.

Upgrading of waste proteins for food.

Inactivation of viruses.

Thiolation of proteins by the method of this invention followed by oxidation to form intermolecular disulfide cross-links make possible the building up of proteins of low molecular weight into larger molecules, thus providing, for example, a means of controlling the molecular weight of proteinaceous plasma extenders within optimum limits.

We claim:

1. A method of introducing thiol groups into proteins which comprises treating the protein with a N-acylhomocysteine thiolactone wherein the acyl group is selected from the group consisting of aroyl and alkanoyl in a neutral medium and in the presence of ions of a metal of the group consisting of silver, copper, mercury and lead, and removing the metal ions from the resulting product.

2. A method of introducing thiol groups into proteins which comprises treating the protein with a N-acylhomocysteine thiolactone wherein the acyl group is selected from the group consisting of aroyl and alkanoyl in a neutral medium and in the presence of silver ions and removing the metal ions from the resulting product.

3. A method of introducing thiol groups into proteins which comprises treating the protein with N-acetylhomocysteine thiolactone in a neutral medium and in the presence of ions of a metal of the group consisting of silver, copper, mercury and lead, and removing the metal ions from the resulting product.

4. A method of introducing thiol groups into proteins which comprises treating the protein with N-acetylhomocysteine thiolactone in a neutral medium and in the presence of silver ions and removing the metal ions from the resulting product.

5. A method of introducing thiol groups into gelatin which comprises treating the gelatin with a N-acylhomocysteine thiolactone wherein the acyl group is selected from the group consisting of aroyl and alkanoyl in a neutral medium and in the presence of ions of a metal of the group consisting of silver, copper, mercury and lead, and removing the metal ions from the resulting product.

6. A method of introducing thiol groups into gelatin which comprises treating the gelatin with a N-acylhomocysteine thiolactone wherein the acyl group is selected from the group consisting of aroyl and alkanoyl in a neutral medium and in the presence of silver ions and removing the metal ions from the resulting product.

7. A method of introducing thiol groups into gelatin which comprises treating the gelatin with N-acetylhomocysteine thiolactone in a neutral medium and in the presence of silver ions and removing the metal ions from the resulting product.

References Cited in the file of this patent

Greenberg: "Amino Acids and Proteins," pages 563 and 567, 1951, first edition.

Benesch et al.: J.A.C.S. 78, April 20, 1956, pages 1597–99.

Schoberl: Angew. Chem. (1948), vol. 60, pp. 7–9.

Benesch, R., et al.: The Introduction of New Sulfhydryl Groups and Disulfide Bonds into Proteins, in Sulfur in Proteins, edited by Benesch et al., N.Y., Academic Press, 1959.